(12) United States Patent
Radovanović

(10) Patent No.: US 12,514,772 B2
(45) Date of Patent: Jan. 6, 2026

(54) ARM SUPPORT STRUCTURE ARRANGED AROUND AN OUTSIDE OF A HEADREST OF A DENTAL OR MEDICAL CHAIR

(71) Applicant: Đorde Radovanović, Belgrade (RS)

(72) Inventor: Đorde Radovanović, Belgrade (RS)

( * ) Notice: Subject to any disclaimer, the term of this patent is extended or adjusted under 35 U.S.C. 154(b) by 9 days.

(21) Appl. No.: 18/576,939

(22) PCT Filed: Jul. 1, 2022

(86) PCT No.: PCT/EP2022/068265
§ 371 (c)(1),
(2) Date: Jan. 5, 2024

(87) PCT Pub. No.: WO2023/280707
PCT Pub. Date: Jan. 12, 2023

(65) Prior Publication Data
US 2025/0041143 A1  Feb. 6, 2025

(30) Foreign Application Priority Data
Jul. 8, 2021 (DK) .............................. PA202100738

(51) Int. Cl.
A47C 16/00 (2006.01)
A61B 90/60 (2016.01)
A61G 15/12 (2006.01)

(52) U.S. Cl.
CPC .............. *A61G 15/12* (2013.01); *A61B 90/60* (2016.02)

(58) Field of Classification Search
CPC ........ A61G 15/12; A61G 15/10; A61B 90/60; A47C 7/541
See application file for complete search history.

(56) References Cited

U.S. PATENT DOCUMENTS

| | | | |
|---|---|---|---|
| 11,930,931 B2* | 3/2024 | Stone ...................... | A47C 7/383 |
| 2010/0295357 A1* | 11/2010 | Koehler ................. | A47C 9/005 297/463.1 |
| 2013/0106163 A1* | 5/2013 | Purpura ............. | B64D 11/0641 297/391 |
| 2013/0341367 A1* | 12/2013 | Purpura .................. | B60R 7/043 29/401.1 |

* cited by examiner

*Primary Examiner* — Amy J. Sterling
(74) *Attorney, Agent, or Firm* — Wenderoth, Lind & Ponack, L.L.P.

(57) ABSTRACT

The present invention is related to an arm support structure attachable to a dental or medical chair, wherein the support structure comprises an outstretched body with an adapted upper support surface providing arm support, wherein the 5 outstretched body part is divided in a first body part hinged to a second body part.

15 Claims, 8 Drawing Sheets

ARM SUPPORT STRUCTURE ARRANGED AROUND AN OUTSIDE OF A HEADREST OF A DENTAL OR MEDICAL CHAIR

FIELD OF THE INVENTION

The present invention relates to an arm support structure supporting arms of dental and medical practitioners, and specially to a support structure releasably positional around an outside of a headrest of a respective dental or medical chair.

BACKGROUND OF THE INVENTION

In their daily work, dentists and other medical practitioners can spend time bent forward with their arms lifted in the air when treating patients sitting in a respective dental or medical chair. This body position of a practitioner may cause prolonged static muscle contractions in for example a dental or medical practitioner's arms. It is known that such repeated static muscle contractions may cause musculoskeletal disorders in the long run.

With reference to a dentist working with a patient, the dentist uses different tools that may be held at the same time in the left and right hand of the dentist. For example, the left arm may hold a dental mirror while the other hand may hold a dental probe, dental curette etc. At the same time the dentist must keep his upper body steady to be able to position and keep respective tools correctly and steady when necessary inside the mouth of a patient. It is also common that a dentist must change position relative to the head of the patient during dental treatment, for example to improve visual view of a tooth being treated. Usually, a dentist sits in a chair behind a dental chair usually stretching his arms forward and downwards towards a patient's head. Sometimes during treatment, the dentist may move, when sitting in a chair, to a position located partly on one of the sides of the dental chair.

It follows from this generic description of a dentist's work that the position of the upper body part of the dentist (or medical practitioner) preferably should be kept in a fixed distance during treatment relative to a patient's head. When the dentist is moving his upper body part, for example when improving the visual view of a tooth, he/she may of course change hand positions when the upper body part moves thereby compensating for possible changes in the preferred or starting body position. However, it is known that static muscle contractions in the muscles supporting the hands may affect the precision of hand movements and manipulations done by the dentist, which may influence the quality of the work.

In prior art there are some examples of mechanical support structures especially made for dentists. A common device is armrests comprising arm supports that may be adjustable and are freely rotatable and movable around at least one axis. Body support is usually provided by a fixed structure attached to a chair the dentist sits in, which a dentist can rest his chest towards when working on a patient sitting in the dental chair.

During use the armrests are normally moved with the movements of the arms of the dentist. However, it is clear from known dental practise that a dentist needs to lift his/her arms from time to time, for example when picking a new tool from a tool tray, or when adjusting a salvia sucking device etc. He/she then needs to find the arm support again and re-adjust the position of his/her hand. This can especially be a problem if the arm support for example accidently has been pushed away. In this manner the arm support is not available as such all the time, and the use of the arm support may easily be experienced as clumsy by a dentist.

For example, when a dentist needs to lift his/her arm during treatment to be able to exercise enough power on a tooth, then the upper body part may also be moving just to be able to provide enough force, and accidentally the arm supports may be pushed out of position. During treatment it may be difficult for the dentist to take away his eyes from the mouth of the patient and it may then be difficult for the dentist to find back to the arm support and continue having the benefit from the arm support.

U.S. Pat. No. 6,619,747 B2 disclose a stationary upper body and arm support providing support of the body of a user resting in a seated or standing position relative to a backside of a dental or medical chair, wherein arm supports allows the user to rest at least one arm during arm movement while continuously engaging the armrest. The arm supports are individually adjustable vertically to accommodate the dynamic and/or continuous movements of the user's arm(s).

WO 02/069826 A1 disclose an arm support for a dentist configured to be in an area above a patient's head or behind the head of the patient.

Therefore, there is a need of an improved support structure that can provide support of arms of dental or medical practitioners regardless of how the practitioner utilize his arms, including lifting and moving the arms, the support structure should be available for the practitioner at any time to engage effortless when needed, and wherein the support structure interfere as little as possible with respective arm and/or body movements of the practitioner during treatment of a patient. In addition, an arm support should be available regardless of how a practitioner is positioned relative to a patient sitting or lying in a dental or medical chair.

According to an aspect of the present invention an arm support structure according to an example of embodiment may be arranged around an outside periphery of a headrest of a dental or medical chair.

According to a further aspect of the present invention, an arm support structure according to an example of embodiment may comprise a chest support supporting an upper body part of a dental or medical practitioner, which is movably attached to an outer outside of an arm support structure according to the present invention.

OBJECT OF THE INVENTION

It is a further object of the present invention to provide an alternative to the prior art.

Particularly it may be seen as an object of the present invention to provide an arm support structure running around in a distance from an outside of a headrest of a dental or medical chair, which is configured to provide relative adjustable height of a first section relative to a second section of the arm support structure.

SUMMARY OF THE INVENTION

Thus, the above-described object and several other objects are intended to be obtained in a first aspect of the invention by providing an arm rest support structure comprising a first body part hinged to a second body part, wherein upper surfaces of the first and second body parts provide arm support at any position of the arm around a headrest of a dental or medical chair.

The invention is particularly, but not exclusively, advantageous for obtaining an arm support structure attachable to a dental or medical chair, wherein the support structure comprises an outstretched body with an adapted upper support surface providing arm support, wherein the body of the arm support structure is attachable to be positioned around an outside periphery of a headrest of a respective chair when attached, wherein the body of the arm support structure comprises a first body part with a first upper support surface hinged to a second body part with a second upper support surface, wherein the second body part is foldable on top of the first body part such that the second upper support surface is facing towards the first upper support surface when folded, and an angle adjustment element, operable with the hinge between the first and second body part, is configurable to adjust an angle between the first upper support surface relative to the second upper support surface between a first and second predefined angle when the first body part and the second body part is unfolded.

Respective aspects of the present invention may each be combined with any of the other aspects. These and other aspects of the invention will be apparent from and elucidated with reference to the embodiments described herein.

DETAILED DESCRIPTION OF AN EMBODIMENT

Although the present invention is disclosed in connection with specific examples of embodiments, it should not be construed as being in any way limited to the presented examples. The accompanying claim set defines the scope of protection of the present invention. In the context of the claims, the terms "comprising" or "comprises" do not exclude other possible elements or steps. Further, the mentioning of references such as "a" or "an" etc. should not be construed as excluding a plurality. The use of reference signs in the claims with respect to elements indicated in the figures shall also not be construed as limiting the scope of the invention. Furthermore, combining individual features mentioned in different claims may possibly be advantageously, and the mentioning of these features in different claims does not exclude that a combination of features is not possible and advantageous.

Figure 1:
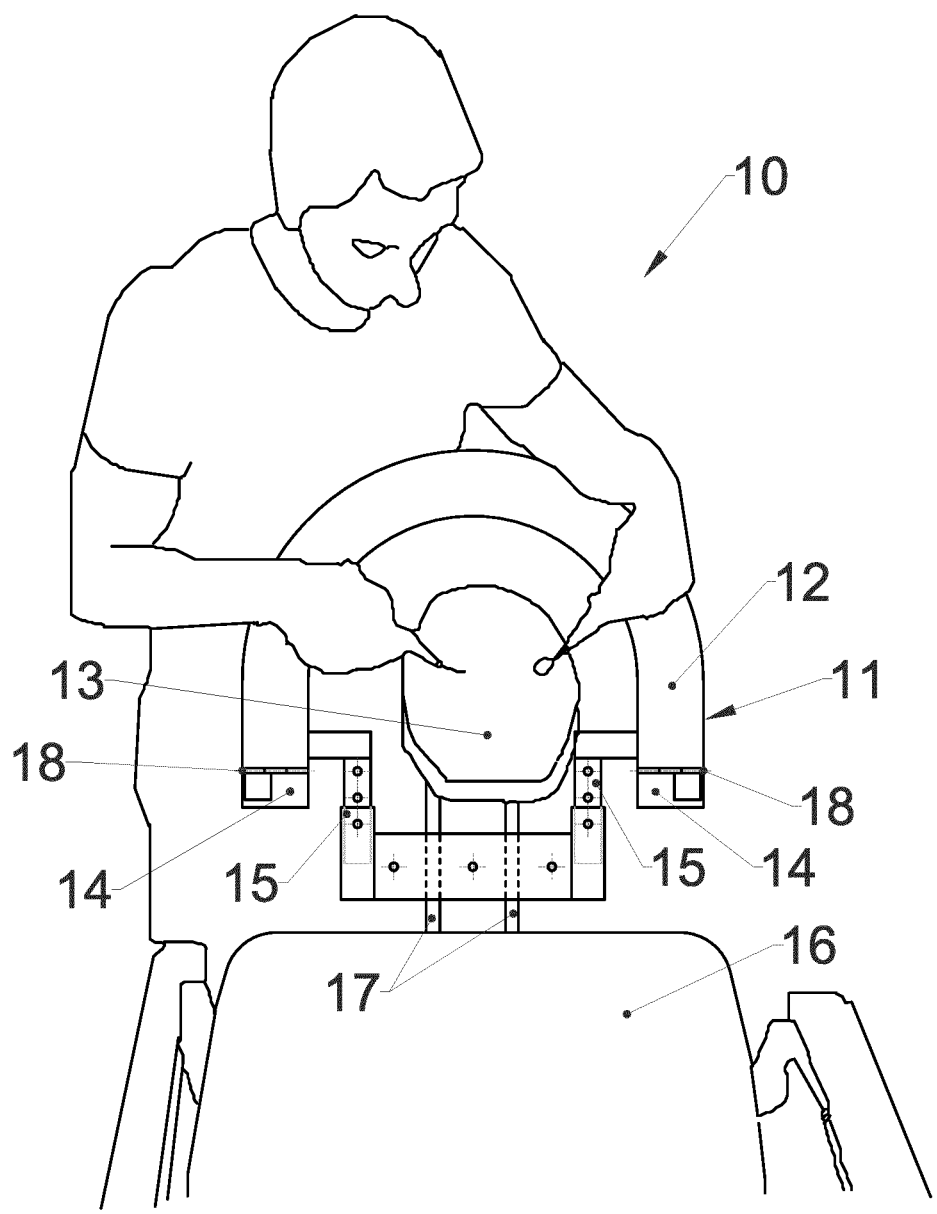
FIG. 1 illustrates an example of embodiment of the present invention illustrated in a folded position.

FIG. 1 illustrate an example of an arm support structure 10 according to the present invention. The arm support structure 10 comprises a first body part 11 hinged to a second body part 12 via hinges 18. The body of the arm support structure constitutes an elongated body comprising a first body part 11 hinged 18 to a second body part 12 and is arranged in a distance around an outside of a headrest 13 attached to a dental or medical chair 16. The shape of the elongated body of the arm support structure of the present invention may have different shapes.

FIG. 1 illustrates the arm support structure 10 in a folded position, i.e., the second body part 12 are foldable around the hinges 18 on top of the first body part 11 such that a second upper support surface of the second body part 12 supporting arms of a practitioner is facing towards a first upper support surface of the first body part when folded. In FIG. 1 the backside of the second body part 12, i.e., the surface opposite the upper support surface of the second body part, is facing upwards due to the folding. As illustrated in FIG. 1, this backside of the second body part can also support arms of a dentist for example.

In FIG. 1 the headrest 13 is attached to a backside of a dental or medical chair, or to a backside of the seat of the chair for example via angled attaching arms 17. Supporting arms 15 of the arm support structure 10 may also be connected to the attaching arms 17 (refer FIG. 2). Then a headrest 13 and an arm support structure 10 are releasably connectable at the same time to a dental or medical chair 16. The arm support structure 10 is connected to the supporting arms 15 at the position of the hinges 18. A part of an upper outer surface 14 at each respective upper ends of the supporting arms 15 is fixed to a backside of the first body part 11 at corresponding ends of the first body part 11. A further surface part of the upper outer surface 14 of the supporting arms are free when the arm support structure is folded. When unfolded the free surface part of the upper outer surface 14 will support the second body part 12 such that the upper support surface of the first body part 11 is flush with the upper support surface of the second body part 12.

Figure 8:
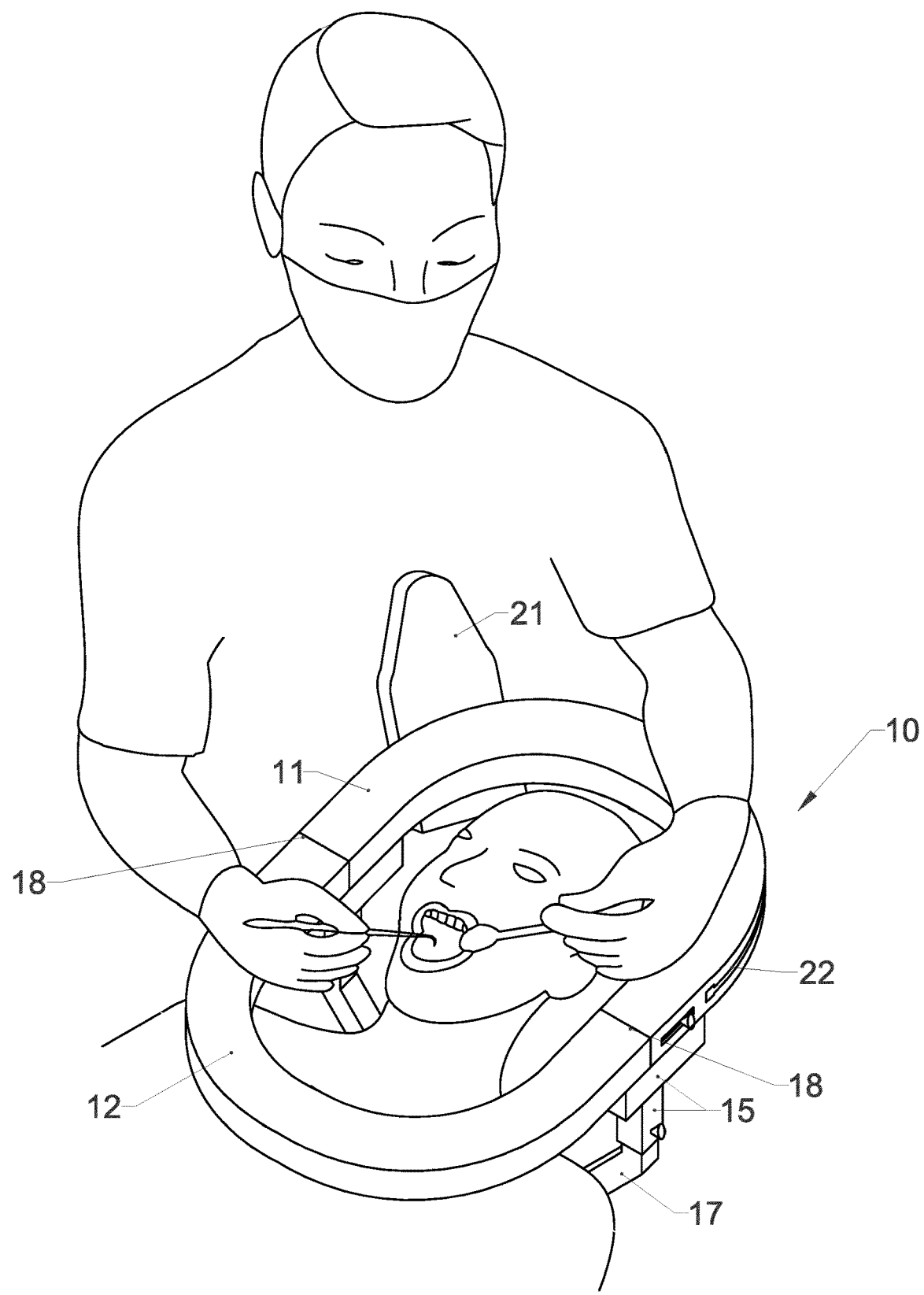
FIG. 8 illustrates a perspective view of an example of embodiment of the present invention in an unfolded position.

FIG. 8 illustrates how the arm support 10 may be functioning in an unfolded position. As can be understood, when the arm support structure 10 is unfolded, the first body part 11 will hinder a patient from resting his head onto a surface of a headrest 13. When the first and second body parts of the arm support structure 10 is folded the patient gains an open access to the headrest 13. When unfolded a dental or medical practitioner has a 360° arm supporting surface constituted by the upper support surfaces of the first and second body parts 11, 12.

Figure 2:
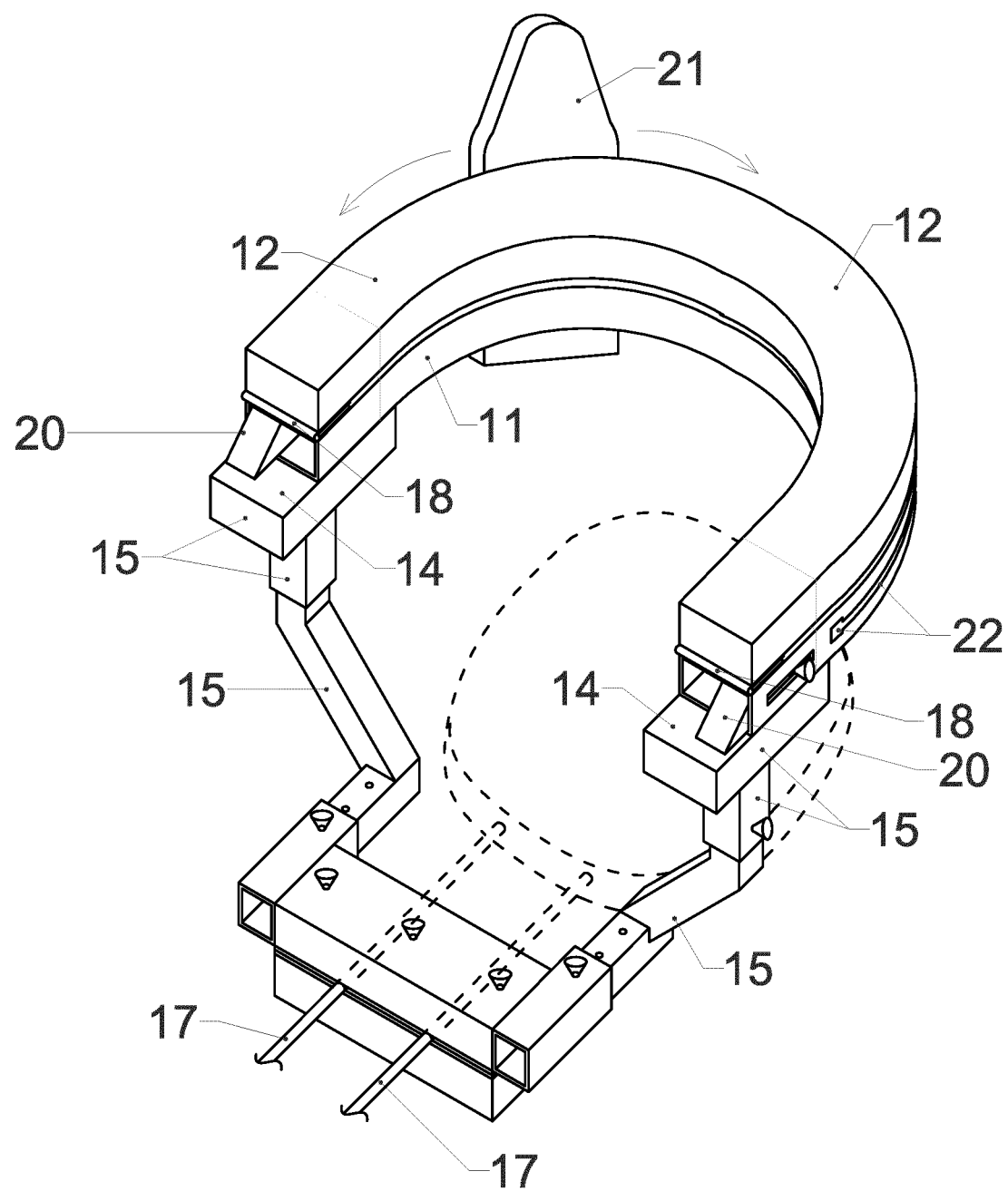
FIG. 2 illustrates a perspective view of an example of embodiment of the present invention in a folded position.

FIG. 2 illustrates an example of an arm support structure 10 according to the present invention comprising further details.

The second body part 12 is folded onto the first body part 11 as discusses above. Along an outer surface of the first body part 11, there is arranged a longitudinal slot 22 running around the whole periphery of the first body part. A chest support plate 21 is attached movably to the slot 22, for example via for example a ball joint inserted into the slot. When a dentist or a medical practitioner leans his chest towards the chest support plate 21, the dentist or the medical practitioner can still move around the head of a patient sitting in the chair while being supported by the chest support plate 21. The ball joint will also allow the chest support plate 21 to tilt around in a vertical plane relative to the chair 16.

In FIG. 2 the attaching arms 17 are configured to be releasably attached to a backside of a seat of a dental or medical chair. The supporting arms 15 of the arm support structure 10 may be clamped to the attaching arms 17 as illustrated.

A wedge-shaped object 20 is slidable resting on the respective free upper outer surfaces 14 at the upper ends of the supporting arms 15. The free surface 14 of the upper ends of the supporting arms 15 are divided into two sections. One section supports the second body part 12 of the arm support structure 10 when unfolded. When the wedge-shaped object 20 is moved away from the first body part 11, i.e. towards the second body part 12, the wedge-shaped surface will be inserted in between the upper outer surface 14 of the upper ends of the support arms 15 and the backside of the second body part 12 (located opposite the upper support surface of the second body part 12). This happens at both ends of the second body part 12. Since the first body 11 is hinged to the second body part 12 via the hinges 18 the resulting effect is that the upper support surfaces of the second body part 12 will rise relative to the upper surface of the first body part 11. There will be an angle between the planes constituted by the upper support surface of the first body part 11 relative to the upper support surface of the second body part 12.

Figure 3:
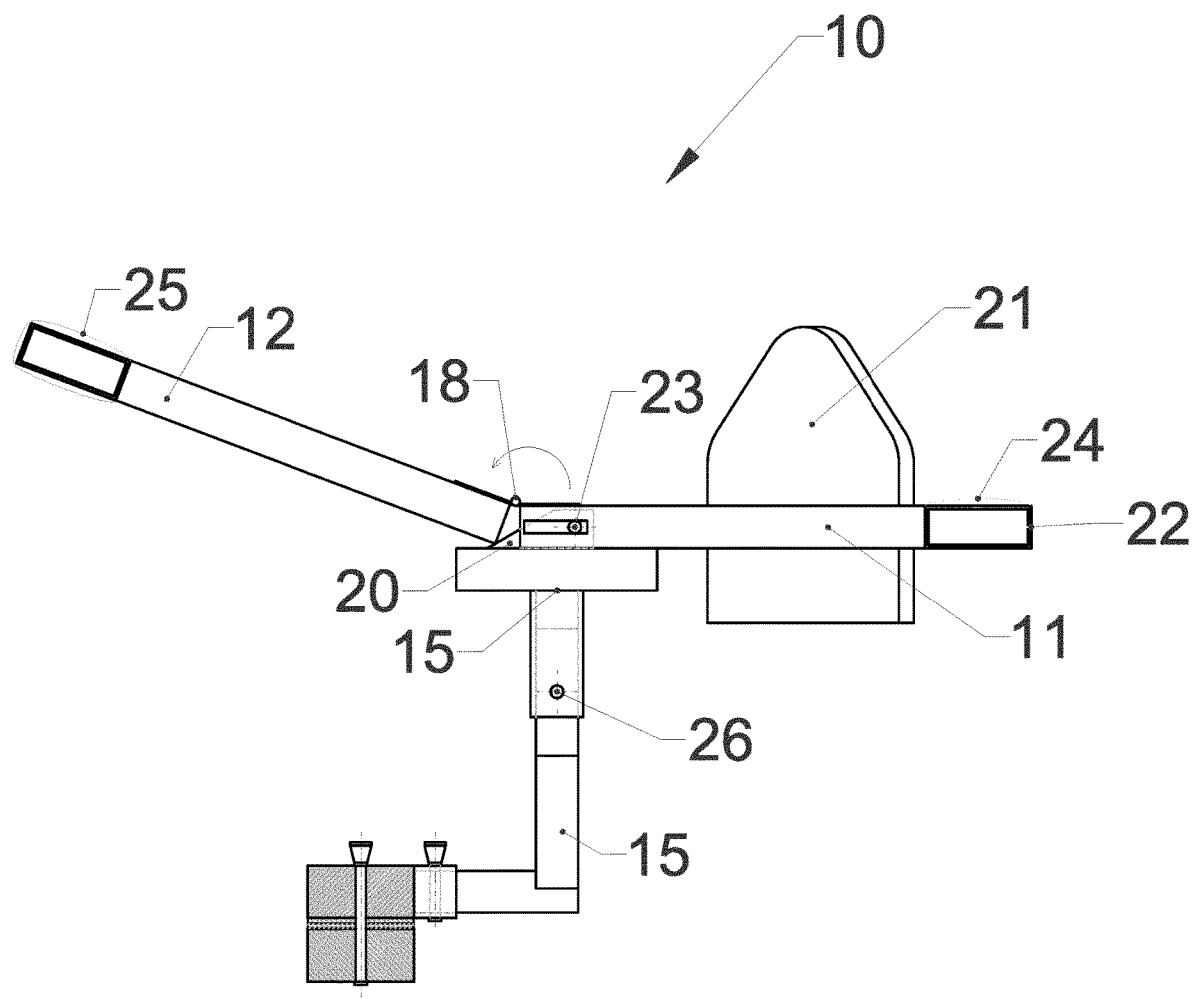
FIG. 3 illustrates a side view of an example of embodiment of the present invention.

FIG. 3 illustrates a cross sectional view of an arm support structure 10 wherein the arm support structure is in an unfolded configuration.

The upper support surface 25 of the second body part 12 is inclined relative to the upper support surface 24 of the first body part 11. The wedge-shaped object 20 is moved forward and can be fixed in a selected position, i.e., providing an intended angle between the respective upper surfaces 24 and 25, by tightening a bolt 23 going horizontally through the body ends of the first body part 11.

FIG. 3 illustrates also that the height of the arm support structure 10 attached to the supporting arms 15 above a seat level of a dental or medical chair can be adjusted and can be fixed at a desired adjustable height by tightening for example a bolt 26 as illustrated.

Figure 4:
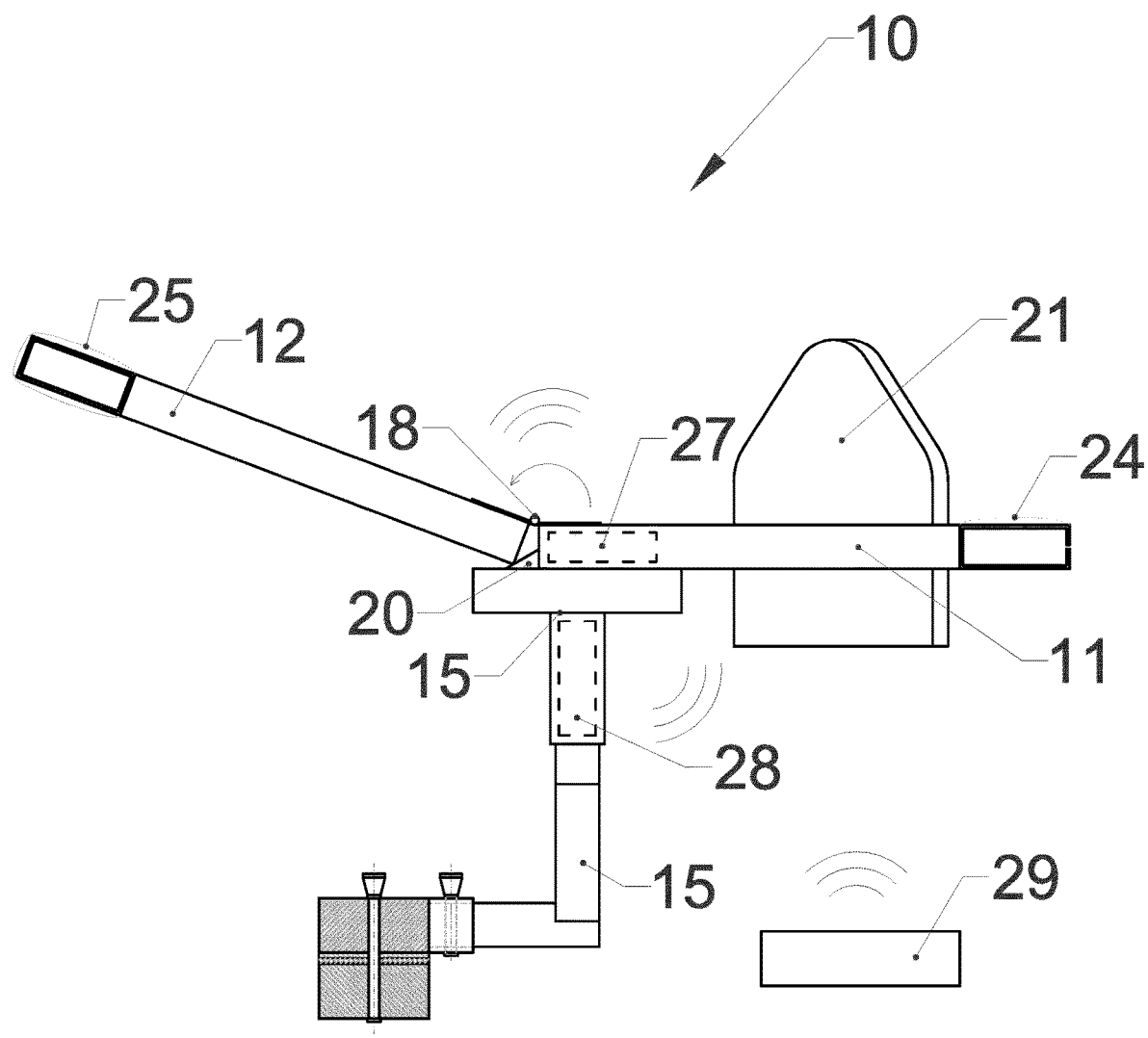
FIG. 4 illustrates an alternative embodiment of the example of embodiment illustrated in FIG. 3.

FIG. 4 illustrates a same configuration as illustrated in FIG. 3. However, in this example of embodiment there is introduced an electric actuator 27 that for example can move the wedge-shaped object 20 forward and backwards. The example illustrates a wireless communication between the actuator 27 and a foot pedal 29. When the foot pedal 29 is activated, for example by tilting an upper surface of the foot pedal forward, the actuator may move the wedge-shaped object 20 forward relative to the first body part 11. When the upper surface of the foot pedal 29 is tilted backwards the wedge-shaped object is may move backwards relative to the first body part 11.

FIG. 4 illustrate the possibility to have an actuator 28 that can be activated to lift or lower the height of the arm support structure 10, for example via activating a corresponding foot pedal.

It is within the scope of the present invention that activating signals can be wired or wireless signals.

Figure 5:
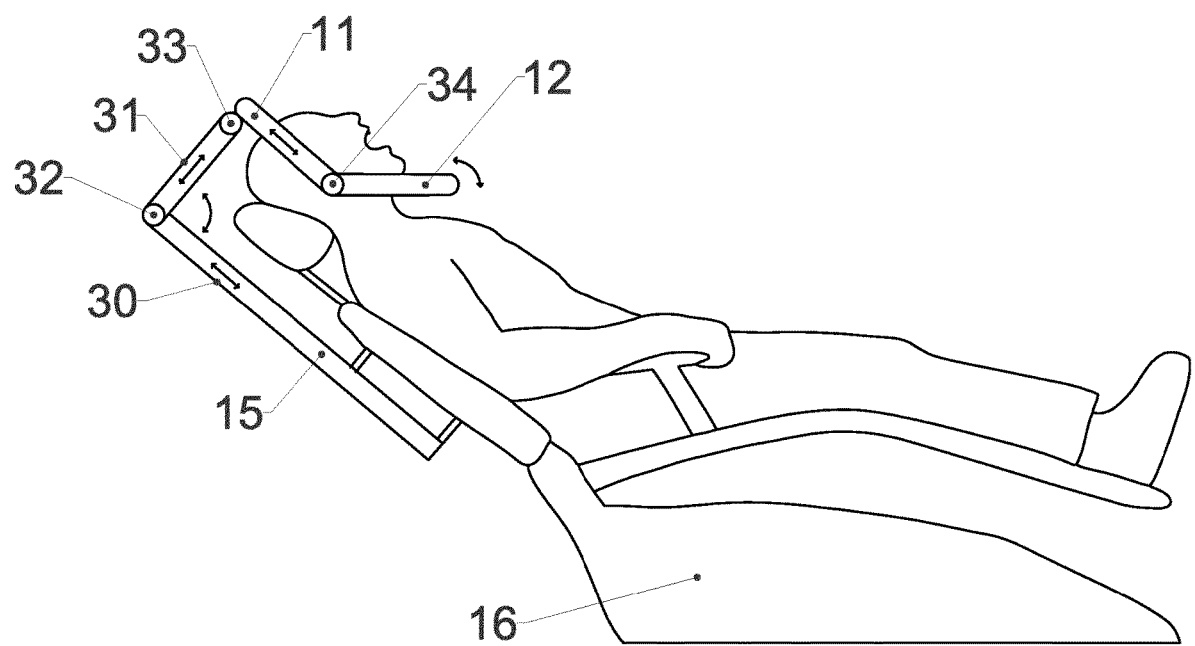
FIG. 5 illustrates a side view of an example of configuration of an example of embodiment of the present invention.

FIG. 5 is a sideview of a dental chair 16 wherein a patient is sitting. The supporting arms 15 is in this example of embodiment is an elongated arm with articulated joints 32, 33. 34. The first body part 11 is attached to the elongated arm in the articulated joint 33 which makes it possible to lower or lift the arm support structure 10 over and down around the head of the patient. The articulate joint 34 corresponds to the hinges 18 in the previous discussed examples of embodiments.

In the example of embodiment illustrated in FIG. 5, the hinged joining of the first and second body part comprises a first articulated joint 34, and the first body part is further connected to the dental or medical chair via a second articulated joint 33.

Figure 7:
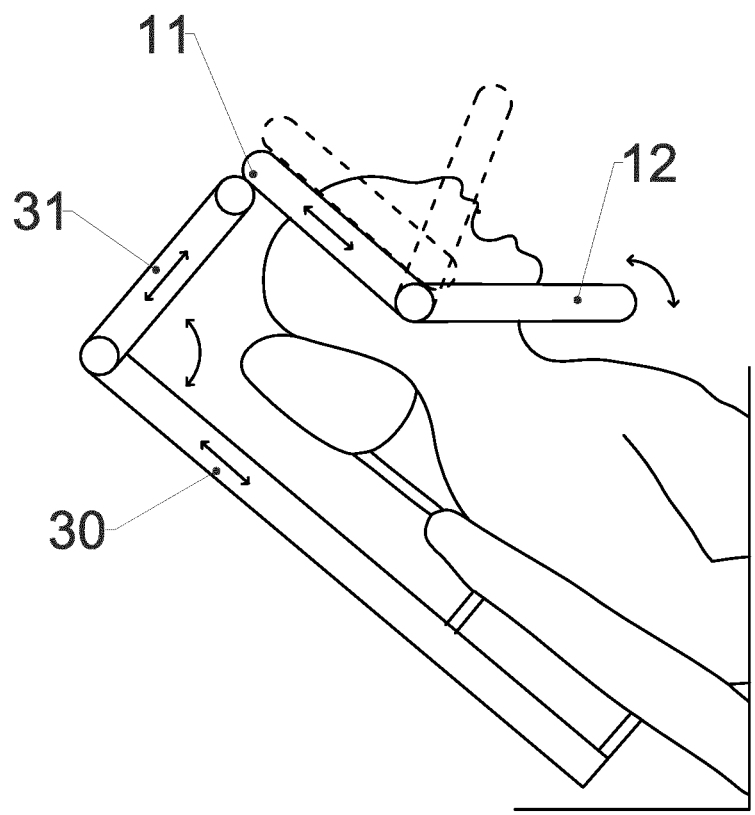
FIG. 7 illustrates details of the example illustrated in FIG. 5.

The elongated arm 15 can be arranged with an actuator 30 that can extend or shorten the length of the arm 15 that is located on the backside of the chair 16. The actuator 31 can extend or shorten the distance between the back of the chair 16 and the location of the face of the patient. These actuators can be operated with wired or wireless signals. The effect on these adjustable lengths is illustrated in FIG. 7. FIG. 7 also illustrate the ability to control the angle adjustment between the respective upper surfaces of the first body part hinged to the second body part.

Figure 6:
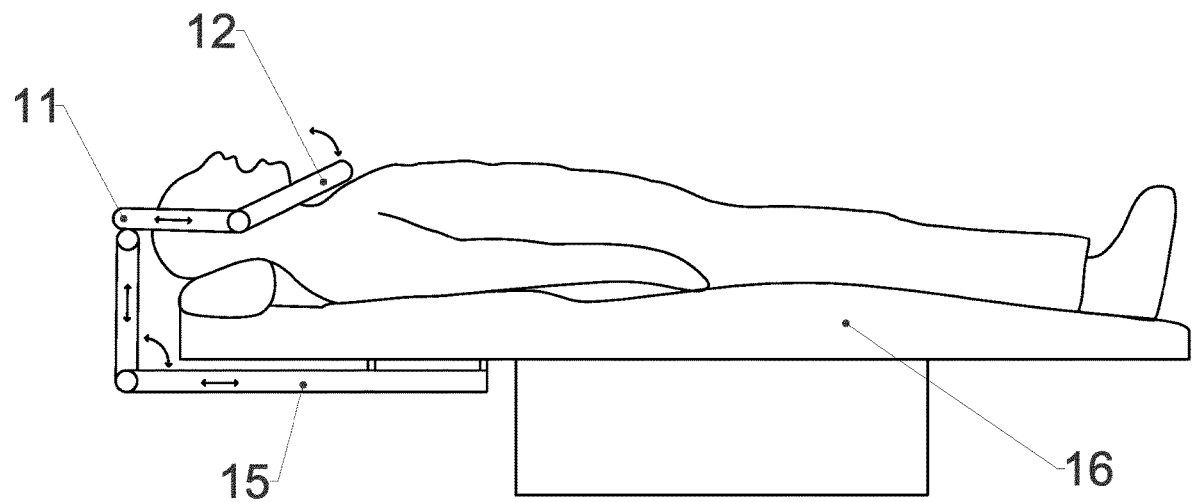
FIG. 6 illustrates a side view of the example illustrated in FIG. 5 in a different configuration.

FIG. 6 illustrates a configuration wherein a patient is laying horizontally in the char 16.

According to an example of embodiment of the present invention a forearm support structure attachable to a dental or medical chair comprises an outstretched body with an adapted upper support surface providing forearm support,
- wherein the support structure is arranged around an outside of a headrest of a respective chair when attached,
- wherein the support structure comprises a first body part with a first upper support surface hinged to a second body part with a second upper support surface,
- wherein the second body part is foldable on top of the first body part such that the second upper support surface is resting on top of the first upper support surface, and an angle adjustment element is configured to adjust an angle between the first upper support surface relative to the second upper support surface between a first and second predefined angle when the first body part and the second body part is unfolded.

The angle adjustment element disclosed above may comprise a first actuator configured to rotate the second body part relative to the hinged first body part in response to a first control signal.

The forearm support structure is attachable to a respective dental or medical chair and is arranged such that the headrest is accessible through an opening restricted by the first body part and the second body part when in an unfolded state.

The forearm support structure of the present invention may provide adjustment of the height position of the first body part and the second body part relative to the height position of the headrest.

The adjustment of height positions in examples of embodiments of the present invention may be activated by at least one configured second actuator in response to a second control signal.

The forearm support structure according to the present invention may be configured to support the first body part and the second body part in an adjustable inclined configuration relative to the headrest surface.

The forearm support structure of the present invention may be configurable to support the first upper body part surface to be parallel with the headrest surface.

The forearm support structure according to the present invention may be configurable to support the second upper body part surface to be parallel with the headrest surface.

The forearm support structure according to the present invention wherein the hinged joining of the first and second body part may comprise a first articulated joint, and the first body part is further connected to the dental or medical chair via a second articulated joint.

The forearm support structure of the present invention, wherein the first body part and the second body part may be shaped as semi-circular bodies.

The forearm support structure of the present invention, wherein the first body part may be shaped with a specific defined body shape, and the second body part is a laterally reversed version of the defined body shape of the first body part.

The forearm support structure of the present invention, wherein the specific shape of the support structure may be a rectangular shape with rounded corners.

The forearm support structure of the present invention, wherein a length and/or width of the rectangular shaped support structure can be extended or shortened via configured telescopic sections of the respective first body part and/or the second body part.

The forearm support structure of the present invention, wherein the adjustment of length and/or width of the support structure may be activated by at least one configured third actuator in response to a third control signal.

The support structure of the present invention, wherein a chest support plate is movably arranged on an outer surface of the one of the two body parts that is facing away from a dental or medical chair when the support structure is mounted.

The invention claimed is:

1. A forearm support structure attachable to a dental or medical chair, comprising:
   an elongated body with an adapted upper support surface providing forearm support, wherein the support structure is configured to be arranged around an outside of a headrest of a respective dental or medical chair when attached,
   wherein the elongated body comprises a first body part with a first upper support surface hinged to a second body part with a second upper support surface,
   wherein the second body part is foldable on top of the first body part such that the second upper support surface rests on top of the first upper support surface; and
   an angle adjustment element configured to adjust an angle between the first upper support surface relative to the second upper support surface between a first predefined angle and a second predefined angle when the first body part and the second body part are in an unfolded state,
   wherein the first body part and the second body part are shaped as semi-circular bodies.

2. The forearm support structure of claim 1, wherein the angle adjustment element comprises a first actuator configured to rotate the second body part relative to the hinged first body part in response to a first control signal.

3. The forearm support structure of claim 1, wherein the forearm support structure is attachable to a respective dental or medical chair, wherein the headrest is accessible through an opening defined by the first body part and the second body part when in the unfolded state.

4. The forearm support structure of claim 1, wherein a height position of the first body part and the second body part is adjustable relative to a height position of the headrest.

5. The forearm support structure of claim 4, wherein an adjustment of the height position of the first body part and the second body part is activated by at least one configured actuator in response to a control signal.

6. The forearm support structure of claim 1, wherein the forearm support structure is configured to support the first body part and the second body part in an adjustable inclined configuration relative to the headrest surface.

7. The forearm support structure of claim 1, wherein the forearm support structure is configured to support the first upper body part surface to be parallel with the headrest surface.

8. The forearm support structure of claim 1, wherein the forearm support structure is configured to support the second upper body part surface to be parallel with the headrest surface.

9. The forearm support structure of claim 1, wherein the first body part is hinged to the second body part by a first articulated joint, and the first body part is configured to be connected to the dental or medical chair via a second articulated joint.

10. The forearm support structure of claim 1, wherein the first body part has a specific defined body shape, and the second body part is a laterally reversed version of the defined body shape of the first body part.

11. The forearm support structure of claim 10, wherein the support structure has a rectangular shape with rounded corners.

12. The forearm support of claim 11, wherein a length or a width of the rectangular shaped support structure is configured to be extended or shortened via configured telescopic sections of the respective first body part or the second body part.

13. The forearm support structure of claim 12, wherein an adjustment of the length or the width is activated by at least one configured actuator in response to a control signal.

14. The support structure of claim 1, wherein a chest support plate is movably arranged on an outer surface of the one of the first and second body parts which faces away from the dental or medical chair when the support structure is mounted.

15. The support structure of claim 1, wherein the first and second body parts are configured such that when the first and second body parts are in a folded state, the headrest of the dental or medical chair is freely accessible to a user of the dental or medical chair.

* * * * *